Nov. 27, 1951     G. W. LEIGH     2,576,884
CUTTER BAR FOR LAWN MOWERS
Filed Nov. 7, 1949
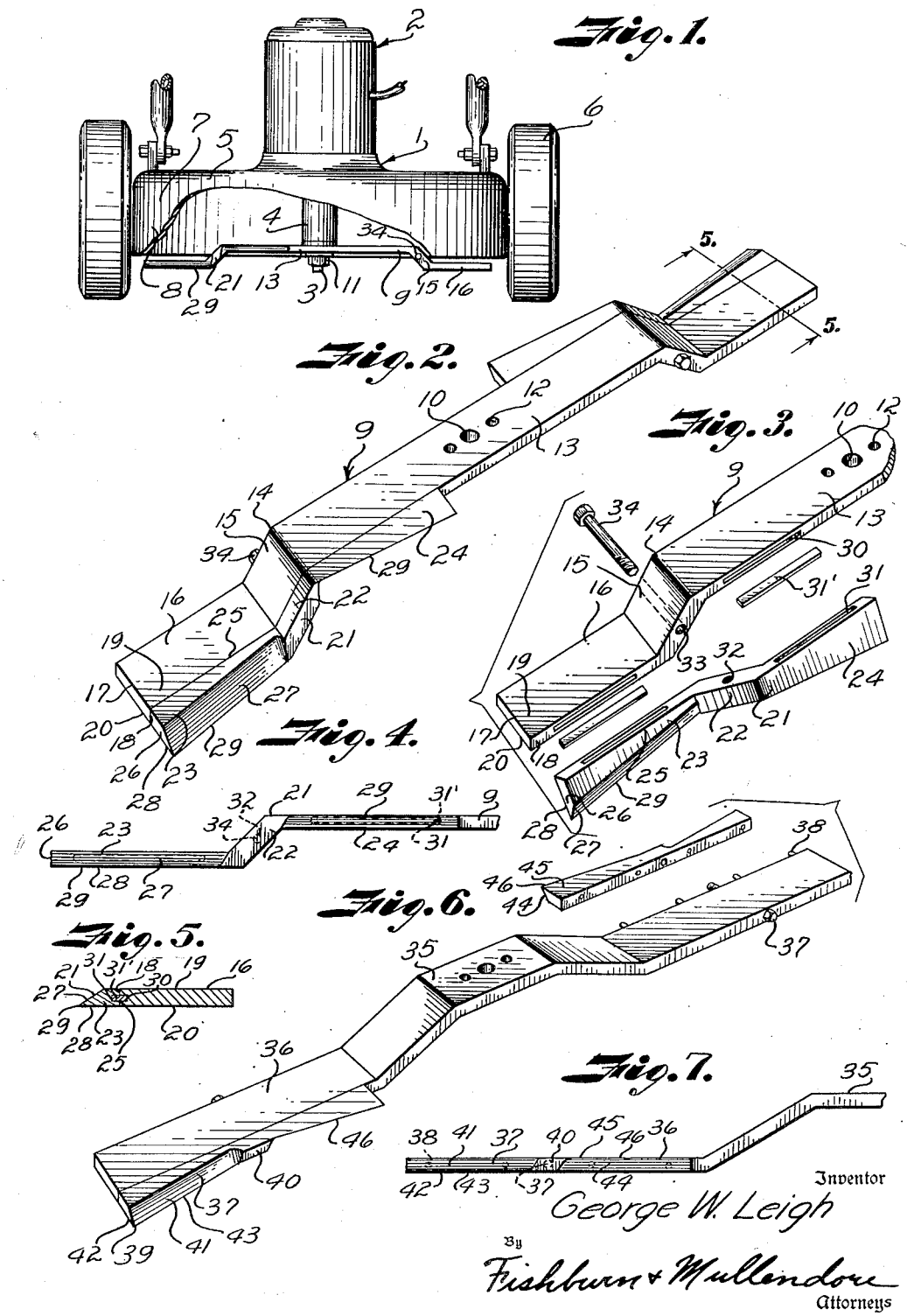

Patented Nov. 27, 1951

2,576,884

UNITED STATES PATENT OFFICE 2,576,884

CUTTER BAR FOR LAWN MOWERS

George W. Leigh, Independence, Mo.

Application November 7, 1949, Serial No. 125,863

3 Claims. (Cl. 56—295)

1

This invention relates to cutter bars for lawn mowers of the rotary type in which the cutter bar is rotated at a relatively high speed in a plane horizontal to the ground and more particularly to a cutter bar having removable cutting edges.

The cutter bars of conventional rotary type lawn mowers are frequently of relatively hard metal in order for the cutting blade to retain its edge. The hard metal is relatively brittle creating a hazard due to the possibility of breakage resulting from the blades striking a stone or other obstruction. Also, the principal cutting by the blade is at the outer edges and when the cutting edge becomes dull there is a beating of the grass which results in uneven lawns. The cutter bars are usually relatively difficult to remove and sharpen and also require considerable time for such sharpening operation.

The objects of the present invention are to provide a cutter bar for a rotary lawn mower which avoids the above disadvantages; to provide a cutting bar with removable cutting edges or blades, said blades being reversible to prolong the period between sharpening; to provide a cutter bar with removable blades wherein the cutter bar may be made of tough, ductile material to eliminate danger of breaking and the blades of hard, tempered metal to hold the cutting edge; to provide a removable, reversible mounting of a cutting blade on the leading edge of the cutter bar; to provide a tapered cutting blade wherein the outer edge is of greater width for longer life to the blades; to provide an offset cutter bar and offset removable and reversible cutting blade mounted thereon whereby only the cutting edge being used has effective engagement with the material to be cut; to provide a cutter bar and removable, reversible cutting blades therefor having a simple yet positive mounting for the blade wherein the structure is economical to manufacture, efficient in operation and easy to maintain.

In accomplishing these and other objects of the present invention, I have provided improved details of structure, the preferred forms of which are illustrated in the accompanying drawings, wherein:

Fig. 1 is a front elevation of a conventional lawn mower with portions broken away to illustrate the arrangement of a cutter bar embodying the features of the present invention thereon.

Fig. 2 is a perspective view of a cutter bar with the cutting blade mounted thereon.

Fig. 3 is a partial perspective view of the cutter bar and cutting blade in disassembled spaced relation.

Fig. 4 is a partial front elevation of the cutting blade mounted on the leading edge of the cutter bar.

Fig. 5 is a transverse sectional view through the cutter bar and blade on the line 5—5, Fig. 2.

Fig. 6 is a perspective view of a modified form of cutter bar and cutting blades thereon.

Fig. 7 is a partial front elevation of the cutter bar and cutting blade shown in Fig. 5.

Referring more in detail to the drawings:

This invention is designed for application to any rotary type power lawn mower 1 wherein a suitable prime mower 2 rotates a vertical shaft 3 journalled in a bearing 4 suitably carried on a frame 5. The frame is supported by wheels 6 rotatably mounted thereon whereby the mower may be manually propelled over the ground by suitable handles. As is customary, the frame includes a housing 7 having a depending wall 8 which acts as a guard.

The cutter bar 9 is preferably formed of bar stock and at the center of said bar is an aperture 10 adapted to be sleeved over the lower end of the shaft 3. The bar is held on the shaft by means of a nut 11 threaded on the lower end of said shaft and suitable driving means fixed to the shaft engages apertures 12 spaced from the aperture 10 to positively drive the cutter bar for rotation with the shaft 3.

The cutter bar 9 is formed of a single strip of metal, the center portion 13 of which forms arms extending horizontally outwardly from the center aperture 10, said strip being bent downwardly as at 14 to form downwardly and outwardly sloping offset portions 15 spaced from the center aperture and terminating in outwardly bent horizontal end portions 16 so that the end portions 16 are arranged below the center portion 13. The end edges 17 of the end portions 16 are equally distant from the axis of the aperture 10 and when rotated thereabout describe an arc having a radius which is less than the radius of the wall 8 whereby the entire blade is under the guard. The cutter bar 9 as illustrated in Fig. 2 is substantially uniform in width and the leading edges 18 of the end portions 16 are substantially perpendicular to the top and bottom faces 19 and 20 respectively.

A reversible cutting blade 21 is applied to each leading edge and secured thereto by suitable fastening devices. In the illustrated structure the cutting blade 21 consists of a center sloping portion 22 conforming in thickness to the sloping portion 15 of the cutter bar with each end of the center portion terminating in oppositely directed parallel end portions 23 and 24 which correspond in thickness to the end portions of the cutter bar whereby the trailing edge 25 of the blade 21 engages the leading edge 18 of the cutter bar and the leading edges of said end portions 23 and 24 are arranged at angles to the trailing edge whereby the width of the end portions 23 and 24 at the outer ends 26 are wider than the center portion 22. Each of the portions 23 and 24 is bevelled on its leading edge as at 27 whereby the relative location of the end portions 23 and 24 may be reversed and the intersection of the bevelled portion 27 of the lower face 28 of the end portion engaging the end portion 16 will form a cutting edge 29.

The cutting blades and cutter bar are provided with a suitable arrangement for maintaining the end portions 23 and 24 in alignment relative to the end portions 16 and center portion 13 of the cutter bar and suitable fastening devices provided for securing the blades to the bar. In the illustrated structure, the leading edge 18 of the cutter bar has keyways 30 arranged therein and extending forwardly therefrom, and the trailing edges 25 of the cutting blades are provided with keyways 31 adapted to align with the keyways 30 and cooperate therewith to receive keys 31' to maintain alignment of the blades and cutter bar. The center sloping portions 22 of the cutting blades are each provided with a threaded aperture 32 aligning with a through bore 33 in the portion 15 of the cutter bar whereby a cap screw or the like 34 may be inserted through the bore 33 and threaded into the threaded aperture 32 to draw the trailing edge 25 of the cutting blade into engagement with the leading edge 18 of the cutter bar. The keyways 30 and 31 and the keys 31' are uniformly located relative to the bore 33 whereby the position of the end portions 23 and 24 of the blade may be reversed and still maintain alignment by means of the keys 31' and keyways 30 and 31.

In using a cutter bar constructed as described, the bar 9 is secured to the shaft 3 of the lawn mower 1 for rotation of the cutter bar with said shaft and with the end portions 16 of the cutter bar below the center portion 13 and the end portions 23 of the blades below the end portions 24. Only the cutting edges 29 of the end portions 23 of the cutting blade and the lower faces 28 and 20 contact the lawn stubble when the mower is in use, the blades moving to cut circular swaths as the mower is moved over a lawn. The principal cutting by the blades is at the outer ends thereof. As this portion becomes dull, the blades tend to beat the grass off rather than cutting same. When the blades become dull, the screws 34 are unscrewed from the threaded apertures 32 and the blades disengaged from the keys 31' and the position of the end portions 23 and 24 reversed. The screws 34 are again threaded into the threaded apertures 32 to secure the blades in reversed position to the cutter bar and the mowing operation may continue, thereby providing a longer period of time between sharpenings of the blades.

When it is desired to sharpen the blades, the blades are removed from the cutter bar and the bevelled portion 27 ground to restore a cutting edge 29. The principal portion requiring sharpening is at the outer or wider portion of the blade, thereby this portion being wider will permit more sharpenings of the blade. Since the cutting is by the cutting edge of the blade in alignment with the end portions 16 of the cutter bar, the other end portion of the cutting blade which is in alignment with the center portion 13 of the cutter bar performs no function until the blade is reversed. Therefore there is only dulling of the blade portion which is in use and effective in cutting the grass.

In the form of the invention illustrated in Figs. 5 and 6, the offset of the cutter bar is closer to the center whereby the end portions 36 are relatively longer than the end portions 16 of the form shown in Fig. 2. The cutting blades 37 are applied to the leading edges of the cutter bar and said blades are preferably slightly shorter than the end portions 36 of said bar. The blades 37 are secured to the bar by suitable screws 37' and key members 38 and the end extremities 39 of said blades are wider than the center portions 40. Slightly less than the half of the length of the blades at each of the outer portions thereof are provided with upwardly directed bevels 41 to cooperate with the bottom surfaces 42 of said blades to form cutting edges 43. The portions of the blades at the other ends thereof are provided with downwardly extending bevels 44 for cooperation with the top surfaces 45 to form cutting edges 46 as illustrated in Figs. 5 and 6. With this form of blade, the outer portions or cutting edges 43 of the blades, when positioned as shown in Fig. 5, perform the cutting of the grass and the cutting edge 46 performs substantially no function. After the cutting edges 43 become dull, the blades are removed and reversed to position the cutting edges 46 at the outer ends of the cutter bar and the blades secured thereto whereby the cutting edges 46 then cut the grass.

It is believed obvious that I have provided a cutter bar with removable, reversible cutting blades which is economical to manufacture, efficient in operation, easily sharpened and capable of prolonging the periods between sharpenings. Also, the blades and cutter bar may be made of different materials to reduce the hazard of breakage upon striking of rocks and other obstructions.

What I claim and desire to secure by Letters Patent is:

1. A cutter for a lawn mower of the rotary type having a vertical power driven shaft and adapted to be secured at a midpoint to said shaft for rotation therewith comprising, a bar having a horizontal center section forming arms extending in opposite directions from the shaft, said bar having downwardly and outwardly sloping portions at the ends of the horizontal arms and terminating in horizontal end portions extending outwardly therefrom below and parallel with the center section of the cutter bar, cutting blades having a center portion corresponding to the downwardly and outwardly sloping portions of the cutter bar and end portions extending from said center portion in alignment with the end portions and center section of the cutter bar, means for removably securing the trailing edges of said blades to the leading edges of the cutter bar, oppositely sloping bevels on the leading edges of the respective end portions of the cutting blade to form sharpened cutting edges, and interengaging means in the blade and cutter bar uniformly disposed about the center of the blade for maintaining the end portions of the blades in alignment with the respective portions of the cutter bar.

2. A cutter for a lawn mower of the rotary type having a vertical power driven shaft and adapted to be secured at a midpoint to said shaft for rotation therewith comprising, a bar having a horizontal center section forming arms extending in opposite directions from the shaft, said bar having downwardly and outwardly sloping portions at the ends of the horizontal arms and terminating in horizontal end portions extending outwardly therefrom below and parallel with the center section of the cutter bar, cutting blades having a center portion corresponding to the downwardly and outwardly sloping portions of the cutter bar and end portions extending from said center portion in alignment with the end portions and center section of the cutter bar, means uniformly arranged relative to the center of the blades for removably securing the trailing edges of said blades in abutting engagement with the leading edges of the cutter bar whereby turning of the blade end for end will reverse the relative position of the end portions of the cutting blade, oppositely sloping bevels on the leading edges of the respective end portions of the cutting blade to form sharpened cutting edges, the plane of the cutting edge of the end portion adjacent the end portion of the cutter bar being substantially in alignment with the lower edge of said end portions of the cutter bar, the plane of the cutting edge of the other end portion of the cutting blade being substantially in alignment with the upper face of the center section of the cutting bar, and interengaging means in the blade and cutter bar uniformly disposed about the center of the blade for maintaining the end portions of the blades in alignment with the respective portions of the cutter bar.

3. A cutter for a lawn mower of the rotary type having a vertical power driven shaft and adapted to be secured at a midpoint to said shaft for rotation therewith comprising, a bar having a horizontal center section forming arms extending in opposite directions from the shaft, said bar having downwardly and outwardly sloping portions at the ends of the horizontal arms and terminating in horizontal end portions extending outwardly therefrom below and parallel with the center section of the cutter bar, cutting blades having a center portion corresponding to the downwardly and outwardly sloping portions of the cutter bar and end portions extending from said center portion in alignment with the end portions and center section of the cutter bar, means uniformly arranged relative to the center of the blades for removably securing the trailing edges of said blades in abutting engagement with the leading edges of the cutter bar, oppositely sloping bevels on the leading edges of the respective end portions of the cutting blade to form sharpened cutting edges, the plane of the cutting edge of the end portion adjacent the end portion of the cutter bar being substantially in alignment with the lower edge of said end portions of the cutter bar, the plane of the cutting edge of the other end portion of the cutting blade being substantially in alignment with the upper face of the center section of the cutting bar, and interengaging means in the blade and cutter bar uniformly disposed about the center of the blade for maintaining the end portions of the blades in alignment with the respective portions of the cutter bar, the ends of the cutter blade being wider than the center portion whereby the cutting edges are arranged at an angle to the leading edges of the cutter bar.

GEORGE W. LEIGH.

REFERENCES CITED

The following references are of record in the file of this patent:

UNITED STATES PATENTS

| Number | Name | Date |
| --- | --- | --- |
| 596,530 | McCoy | Jan. 4, 1898 |
| 1,622,611 | Sera | Mar. 29, 1927 |
| 2,083,103 | Steiner | June 8, 1937 |
| 2,318,430 | Spahn | May 4, 1943 |
| 2,480,944 | Malpass | Sept. 6, 1949 |